Sept. 20, 1966  C. J. BAUDER ETAL  3,273,321
AIR FILTER HAVING A REPLACEABLE CARTRIDGE
Filed Aug. 26, 1963  4 Sheets-Sheet 1
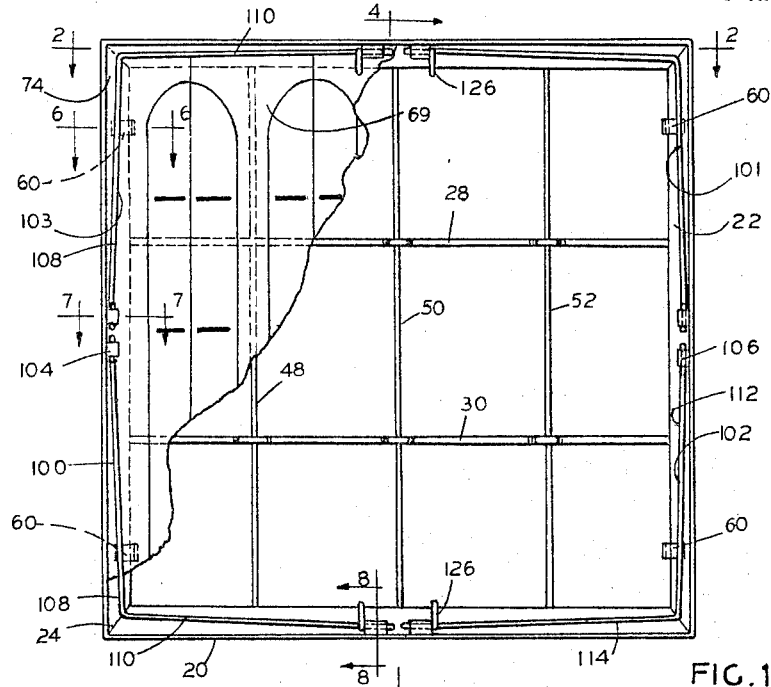
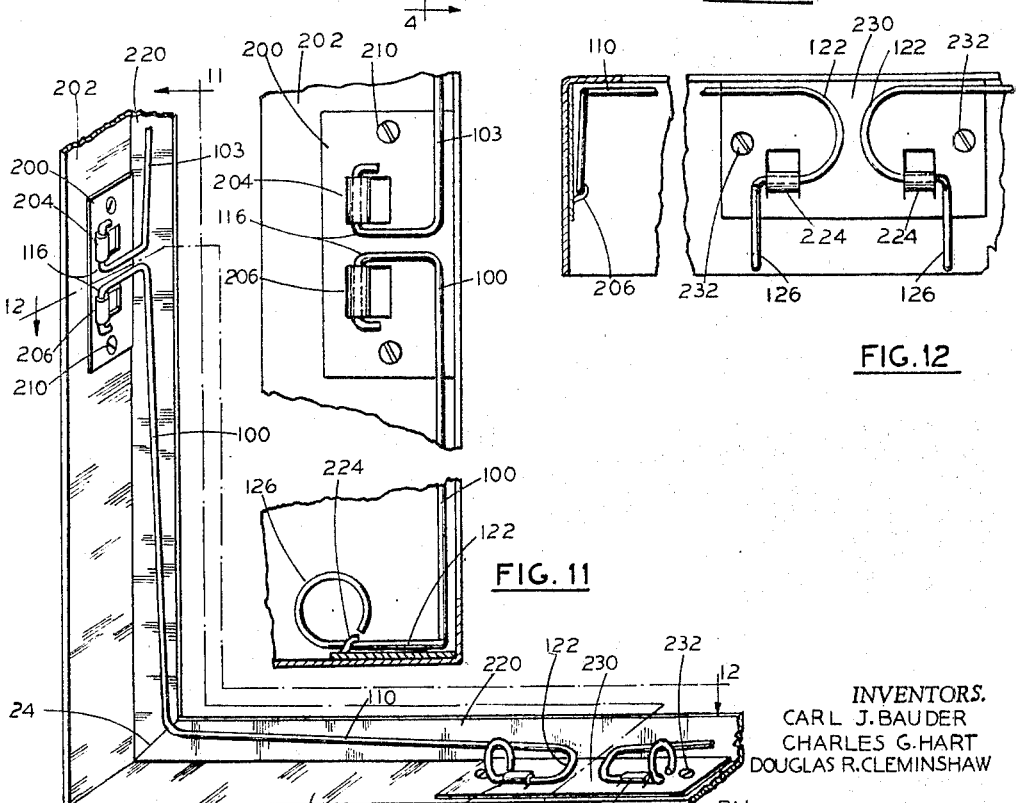
INVENTORS.
CARL J. BAUDER
CHARLES G. HART
DOUGLAS R. CLEMINSHAW
BY
ATTORNEY Sept. 20, 1966  C. J. BAUDER ETAL  3,273,321
AIR FILTER HAVING A REPLACEABLE CARTRIDGE
Filed Aug. 26, 1963  4 Sheets-Sheet 2
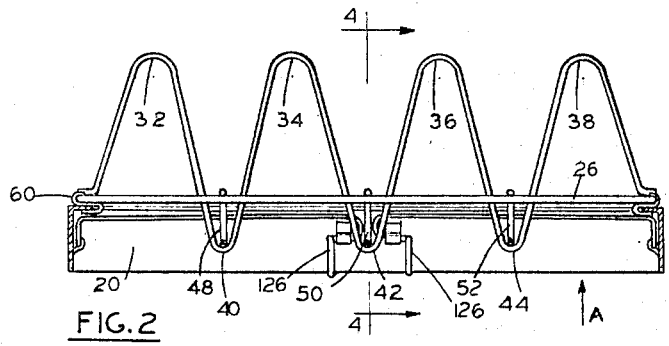
FIG. 2
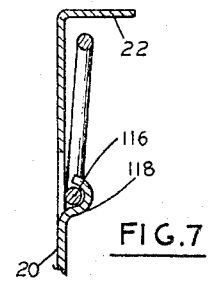
FIG. 7
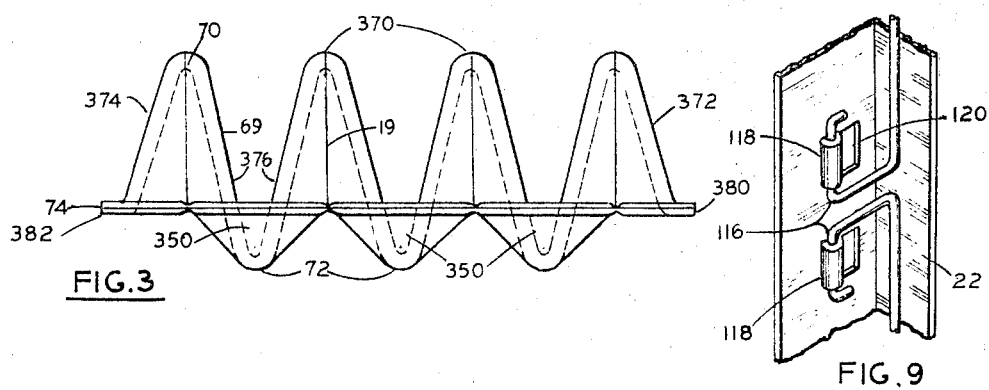
FIG. 3  FIG. 9
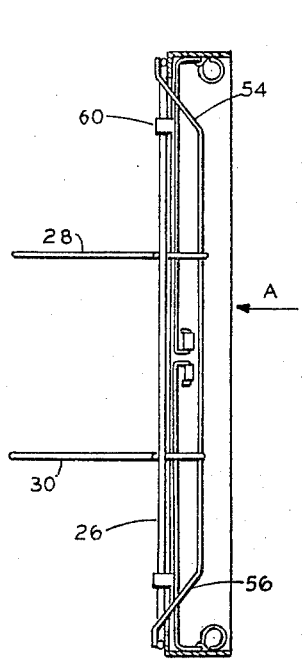
FIG. 4
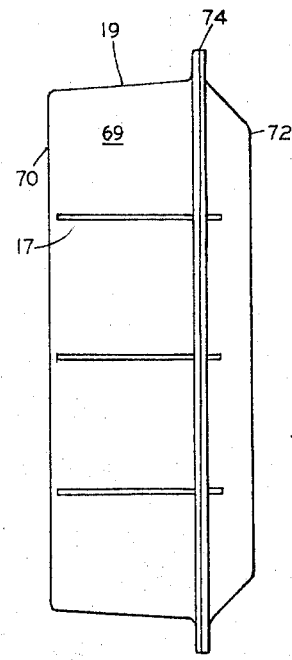
FIG. 5
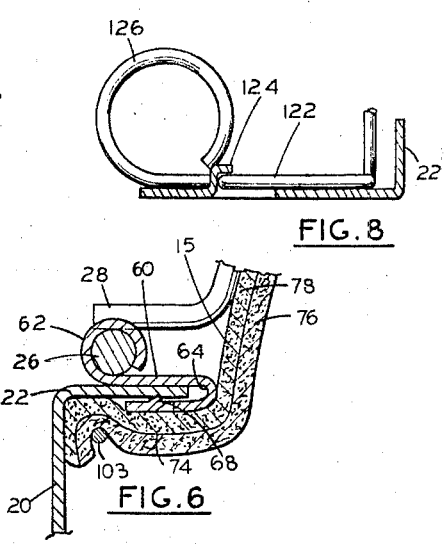
FIG. 8
FIG. 6
INVENTORS.
CARL J. BAUDER
CHARLES G. HART
DOUGLAS R CLEMINSHAW
BY [signature]
ATTORNEY

INVENTORS
CARL J. BAUDER
CHARLES G. HART
DOUGLAS R. CLEMINSHAW

BY
ATTORNEY

Sept. 20, 1966　　　C. J. BAUDER ETAL　　　3,273,321
AIR FILTER HAVING A REPLACEABLE CARTRIDGE
Filed Aug. 26, 1963　　　　　　　　　　　　4 Sheets-Sheet 4
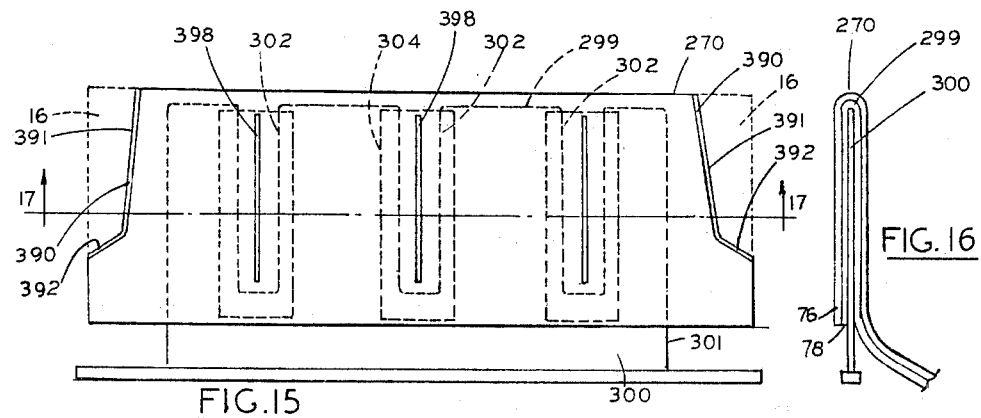
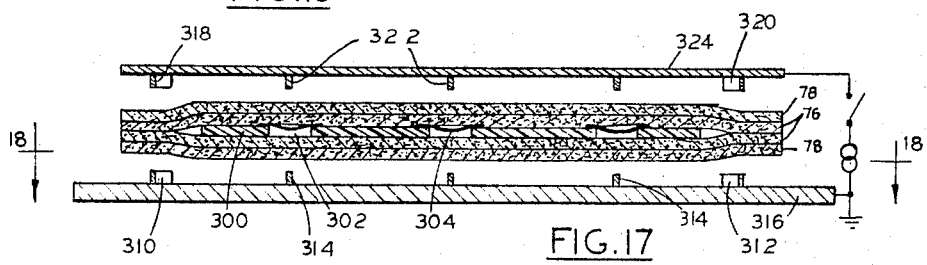
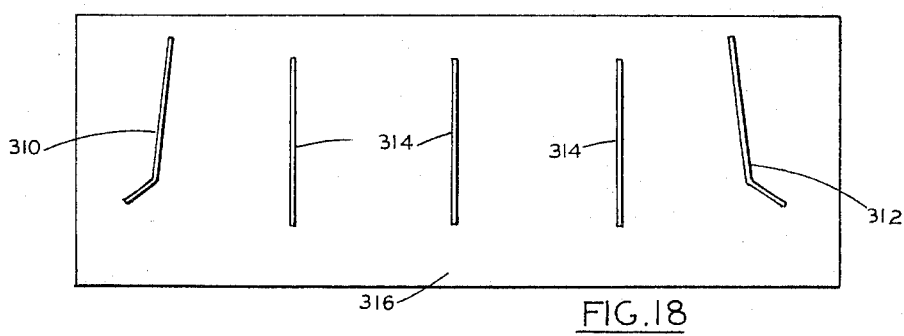
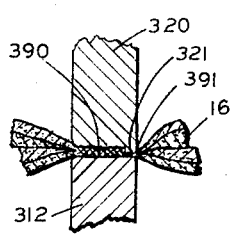
INVENTORS
CARL J. BAUDER
CHARLES G. HART
DOUGLAS R. CLEMINSHAW
BY
ATTORNEY united States Patent Office 3,273,321
Patented Sept. 20, 1966

3,273,321
AIR FILTER HAVING A REPLACEABLE
CARTRIDGE
Carl J. Bauder, Charles G. Hart, and Douglas R. Cleminshaw, Syracuse, N.Y., assignors to Cambridge Filter Corporation, Syracuse, N.Y., a corporation of New York
Filed Aug. 26, 1963, Ser. No. 304,351
13 Claims. (Cl. 55—341)

This invention relates to air filters, and more particularly to a filter of the extended surface replaceable cartridge type.

In central air conditioning and air heating systems as have been installed for domestic or office building use, replaceable panel type filters have been employed. Such panel type filters are supported in rectangular flanged frames, and the number of such filters may vary from one to any number arranged in bank form, each panel type filter being supported in a frame, the frame, or bank of frames being disposed in an air duct through which flow of air is induced by a blower. The panel type filter units require replacement at intervals, the frequency of which depends upon the amount of contamination in the air. By reason of the square or rectangular nature of the panel type filter units, the flow area through the unit is restricted. The depth of the filter media is such that resistance to flow is initially relatively high, nad increases considerably as the units become contaminated.

The present invention is directed to a filter unit adapted to installations of the type referred to wherein the area of the filter media for each unit is considerably extended by employing a pleated formation, and wherein the thickness of the media is considerably reduced, so that the efficiency is greatly increased, in regard to resistance to air flow. Due to the extended area afforded by the pleated formation, the dust holding capacity is greatly increased, and the frequency of replacement is reduced.

The filter unit comprises a low cost frame which may be installed in single units or in banks. Each unit has a filter media support grid readily attached to the down stream side of the frame. The filter media cartridge, composed entirely of filter media, is conveniently installed in the frame, and is readily replaced. Convenient sealing rods, hinged to each side of the frame, engage the marginal edges of the cartridge. The invention further contemplates the conversion of the frame installations adapted for panel type filters, so that the frames thereof will accommodate filter cartridges of the present invention. Thus the frame or frames of a panel type filter installation is or are readily converted so as to obtain the benefits derived from the use of pleated filter media. Because of the filter's high efficiency resulting from low resistance to air flow, the invention may be employed as a prefilter for ultra high efficiency filters so as to materially extend the life of the cartridges employed in such ultra high efficiency filters.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawing, wherein like reference characters indicate like parts:

FIGURE 1 is a front elevational view looking downstream with respect to a filter unit, a portion of the cartridge having been broken away;

FIGURE 2 is a sectional view of the frame and grid, taken substantially on the line 2—2 of FIGURE 1;

FIGURE 3 is a top plan view of a cartridge oriented in respect to the frame and grid of FIGURE 2;

FIGURE 4 is a sectional view of the grid and frame, taken substantially on the line 4—4 of FIGURE 1 or FIGURE 2;

FIGURE 5 is a side elevational view of a cartridge oriented in respect to the frame and grid as shown in FIGURE 4;

FIGURE 6 is a greatly enlarged fragmentary sectional view taken substantially on the line 6—6 of FIGURE 1;

FIGURE 7 is an enlarged fragmentary sectional view taken substantially on the line 7—7 of FIGURE 1;

FIGURE 8 is an enlarged fragmentary sectional view taken substantially on the line 8—8 of FIGURE 1;

FIGURE 9 is a fragmentary perspective view of the pivotal mount of two retainer rods;

FIGURE 10 is a fragmentary perspective view showing conversion of a standard panel type filter unit frame by applying retainer rod adapters thereto;

FIGURE 11 is an enlarged fragmentary view of the frame and pivot plate and lock plate of FIGURE 10, as viewed sidewise in the general direction indicated by the arrows and broken line 11—11 of FIGURE 10;

FIGURE 12 is an enlarged fragmentary view of the lock plate and pivot plate of FIGURE 10, as viewed downwardly in the general direction indicated by the arrows and broken line 12—12 of FIGURE 10;

FIGURE 15 is a diagrammatic plan view of a fold of media disposed over a pleater board, after heat fusion to form a pocket;

FIGURE 16 is a diagrammatic end view of filter media folded over the pleater board, before or after forming a pocket;

FIGURE 17 is a sectional view taken substantially along the line 17—17 of FIGURE 15, showing upper and lower electrodes to effect the heat fusion indicated in FIGURE 15;

FIGURE 18 is a plan view of the work table and lower electrodes of FIGURE 17; and FIGURE 19 is an enlarged fragmentary sectional view through two electrodes in fusion position to form a side seam.

Figure 13:
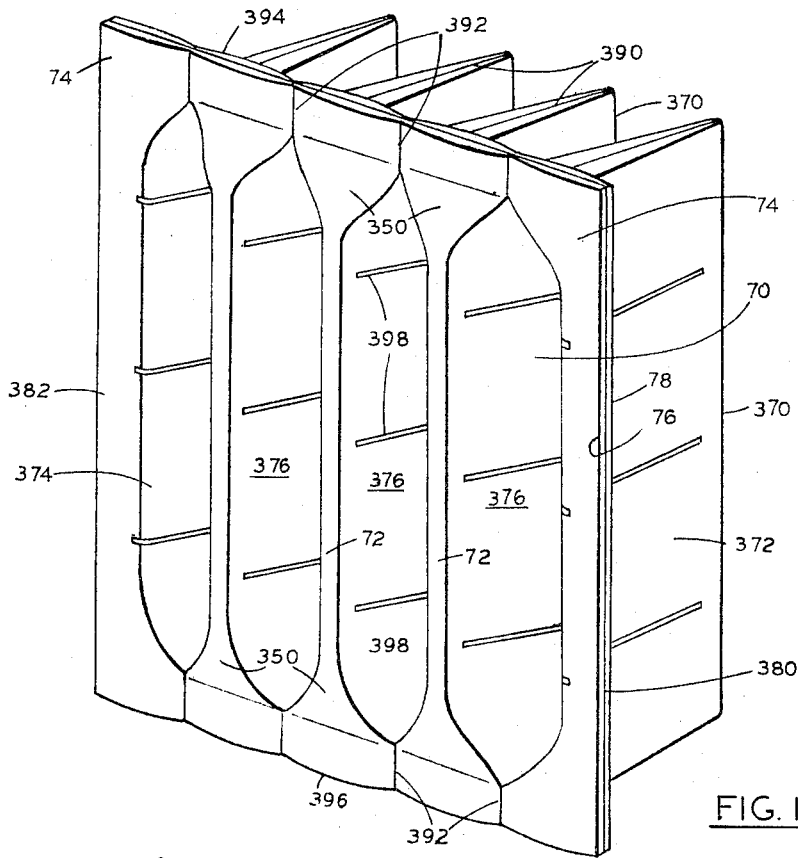
FIGURE 13 is a perspective view of the filter cartridge expanded.

Referring to the drawings and particularly FIGURE 1, there is shown a typical filter unit comprising a rectangular angle iron frame 20, which may be formed of a single length of angle sectioned sheet iron, aluminum or other material, the flange 22 being mitered as at 24 in the corners and the ends being joined in any suitable manner. Such frames are usually square or somewhat rectangular, and one standard size may be approximately 24 inches square. The frame is adapted to be disposed in a duct either as a single unit, or in a bank of units, and all of the air to be filtered flows through the frame opening in a direction as indicated by the arrows A (see FIGURES 2 and 5). Secured to the downstream side of the frame and particularly the flange 22 thereof, is a heavy wire rectangular frame 26, of such size as to lie behind the flange 22. The wire frame 26 is provided with two, or as many as desired, laterally extending sinuous stiff wire members 28 and 30, each having rounded pocket forming loops 32, 34, 36 and 38, and relatively acute angled intermediate bends 40, 42 and 44, the latter being saddled over vertically extending stiff wires 48, 50 and 52, the vertical wires being offset at their ends as at 54 and 56. The ends of the wires 28 and 30, and wires 48, 50 and 52 may be welded or otherwise secured to the downstream side of the wire frame 26.

The wire frame may be attached to the flange 22 of the angle iron frame by spring clips 60. Each clip, see FIGURE 6, has a loop portion 62 disposed around the vertical wires of the wire frame 26, and U-bent portions 64 adapted to yieldingly grip the flange 22 of the angle iron frame. In practice four such clips will suffice and are located several inches inwardly of the corners of the wire frame 26, and it will be understood that for attaching the wire frame 26 to the flange 22, the wire frame may be temporarily sprung inwardly so as to permit the return bent portions of each of the clips to be slid over the flange 22. Each of the clips may have a struck in tooth 68 to enhance the grip of the clip upon the flange 22, once the same is installed.

A filter media cartridge of porous non-woven filter fibers, such as modified acrylic fibers, is formed with pockets 70 for insertion into the pocket forming loops 32, 34, 36 and 38 of the support wires 28 and 30, and folds 72 for disposition over the wires 48, 50 and 52 and the relatively acute bends 40, 42 and 44 of the support wires 28 and 30. The cartridge is provided with a perimetral flange 74 adapted to seat and seal against the upstream side of the flange 22 of the angle iron frame 20. The cartridge may be formed of two superimposed layers 76 and 78 of acrylic fibers, the upstream layer being of a coarser mesh than the downstream layer. Such fibers may be treated to render the same fireproof. The combined relaxed thickness of the two layers may approximate about an inch, but it will be understood that the layers are readily compacted when subjected to even light pressure to a thickness of less than an eighth of an inch.

As indicated in FIGURE 6, the perimetral flange 74 of the cartridge is adapted to seat upon the upstream side of flange 22. In order to secure the cartridge upon the frame flange and provide a seal, spring wire retainers or rods 100 and 102 and 101 and 103 are provided. The rods are adapted to compress the cartridge flange against the frame flange and side wall. Each of the retainer rods is adapted to overlie the cartridge frame flange 22 at its respective corner, and along the frame flange 22 to points approximately midway of the width and length of the cartridge frame flange.

Each of the retainer rods 100 and 102, being left and right respectively, are pivoted centrally on the sides of the frame 20 as at 104 and 106. The retainer rod 100 is adapted to extend downwardly as at 108 and laterally as at 110 to the center area of the lower portion of the frame 20, while retainer rod 102 is adapted to extend downwardly as at 112 and laterally as at 114 to the central area of the lower side of the frame. Each retainer rod has a return bent section 116 (see FIGURE 9) acting as a pintle in a socket formed by a portion 118 struck out of the side frame as at 120. The free ends of each retainer rod has a 180° return bent resilient loop 122 adapted to yieldingly latch under a finger as at 124 struck from the frame 20, and the ends of each of the retainer rods beyond the loop 122 have a convenient finger ring as at 126.

In FIGURE 1, a portion of the filter media cartridge 69 is shown in place in the upper left hand corner, with the retainer rod 103 shown disposed over the cartridge perimetral flange 74. The spacing between the pintle portion of each retainer rod and its hinge socket 118, in respect to the frame flange 22, and the radius of the return bent portion 122 and the location of the latch finger 124 with respect to the flange 22, are so related that when each retainer rod such as 103 is latched in position as indicated in FIGURE 1, the portions 108 and 110, of the retainer rod 103 are brought to bear yieldingly against the perimetral flange 74 of the cartridge to compress the filter media flange against the frame flange 22 and thus form a continuous seal around the frame. It will be seen that each of the retainer rods when unlatched from their respective latch hooks 124, are readily pivoted out of the way so as not to obstruct insertion of or removal of a filter media cartridge. When a cartridge is in place, each retainer rod is readily swung into sealing position, as indicated in FIGURE 1 so as to compress the soft compressible fibrous material of the cartridge flange 74 against the frame flange 22 and to thereby form a continuous seal between the cartridge and frame extending around the entire perimeter of the cartridge and frame.

As thus far described, a frame 20, wire grid 26, and retainer rods form a unit, for supporting a replaceable filter media cartridge 69. A single frame or unit may be installed in a small domestic hot air or air conditioning system, or a plurality of such frames, or units may be employed in bank form for larger installations.

The invention is adapted to be employed in the form of a conversion kit, to convert filter frames that have already been installed for use with panel or mat type filters. As shown in FIGURES 10, 11 and 12, the filter frame of such a unit, may have applied to it a pair of retainer units, each comprising a mounting plate 200 for attachment to the midpoint of the side members 202 of the frame 220. The mounting plate is provided with struck up hinge forming fingers 204 and 206 for receiving the return bent pintle forming ends 116 of the retainers, as for example 100 and 103, and has apertures for self tapping screws 210 for attachment of the plates 200 to the frame, as indicated in FIGURES 10 and 11. The kit also includes a pair of identical plates 230 each having two struck out latch fingers 224 to receive the loop ends 122 of the retainer rods. Plates 230 are secured to the midpoints of the upper and lower frame members by self tapping screws as is shown at 232, for example in FIGURES 10 and 12.

Either after or prior to the installation of the retainer rods to a frame in the manner described, a wire grid of a size commensurate with the frame, may be inserted through the frame aperture and affixed to the downstream side of the frame flange by the spring clips 60 in the same manner as indicated in FIGURES 1 and 6. The frame is thus converted and ready for the application thereto of a filter media cartridge of the type indicated at 69, and conversion from a panel type filter to a filter of the extended pleated media type has been effected, upon the application of a cartridge.

Figure 14:
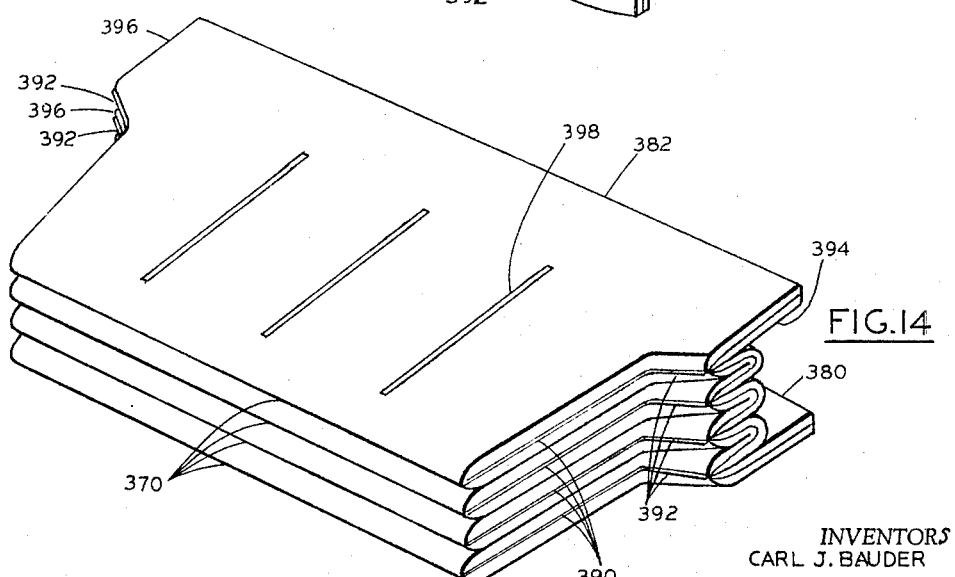
FIGURE 14 is a perspective view of the filter cartridge folded.

In FIGURE 13, the cartridge is shown in expanded form ready for insertion into the frame and over the wire grid structure. In FIGURE 14, the cartridge is shown folded, for further compacting if desired, as for storage or shipment. The carttridge shown is made from two elongated rectangular sections of filter media, which may be drawn from supply rolls. The two sections or layers 76 and 78 are superimposed and thereafter pleated to form downstream folds 370, and upstream folds 72. Returning to FIGURE 13 (also see FIGURE 3) it will be seen that the end pleats have end flanks 372 and 374 that are of lesser depth than the remaining flanks 376 of the pleats, and that the ends 380 and 382 of the rectangular sections are turned out and form a portion of the perimetral sealing flange 74, and lie in a plane intermediate of the plane of the downstream folds 370, and of the plane of the upstream folds 72. Thus a considerable portion of the filter cartridge, when positioned in the frame and upon the grid structure, projects upstream into the frame, to thereby efficiently utilize the space therewithin. Conversely the portion of the cartridge that extends downstream of the frame flange 22 is minimized, and the length of duct or plenum necessary to house the downstream portion of the filter is held to a minimum. It should also be observed that the somewhat inclined triangular area 350 extending from the plane of the sealing flange 74 to the upstream folds 72 nicely conform to the offsets 54 and 56 of the grid wires 48, 50 and 52.

Referring again to FIGURE 14, where the cartridge is shown folded, it will be appreciated that as folded, it may be further compacted due to the loose fibrous and compressible nature of the media, so that in storage, or in a shipment package, considerably less thickness is required than the folded height indicated. Referring to both FIGURES 13 and 14, it will be seen that each pleat is closed along its side edges by a seam which extends from the respective fold 370 as indicated at 390, and thereafter extends at an angle as at 392, to the marginal edges 394 and 396 of the filter. The edges 394 and 396 constitute the upper and lower edges of the filter when expanded as in FIGURE 13, and such edges take on a sinuous contour when the cartridge is folded as can be seen in FIGURE 14. Such seams may be formed by stitching. Where plastic heat fusible material is employed such as media composed of acrylic fibers, the seam may be heat fused. On the other hand the seams may be formed by use of a suitable adhesive.

To prevent undue separation of the two thicknesses of media at strategic points, or to provide a stiffening effect, the two thicknesses may be tightly stitched or adhesively secured together along lines as indicated at 398, and if the material be of plastic, the two layers may be compressed and heat fused along the lines 398 to attain the same effect.

In forming the filter cartridges, the two layers 76 and 78 of filter media of acrylic fiber, suitably modified, may be drawn from supplies which may be in roll form. The layer which ultimately forms the upstream layer 76 of the cartridge may be composed of coarser fibers and has less density than the other layer. The superimposed layers, as drawn from the supply will preferably be of a suitable width, not less than the height of the filter cartridge as indicated, for example, in FIGURES 5 and 13. Each layer may have a completely relaxed expanded thickness of about one-half inch, or one inch for both layers. As the superimposed layers are drawn from the supply rolls, a suitable length of the superimposed layers of media sufficient to form one pleat, or one pocket, is folded as at 270 (see FIGURES 15 and 16) over the edge 299 of a flat thin pleater board 300 of insulating material such as Bakelite, to form one pleat that ultimately will become a pocket with the fold 270 becoming a downstream fold 370. The length of media is folded flat over both sides of the board, the board having a width as at 301 substantially less than the width of the media as shown in FIGURE 15, and the height of the pockets to be formed, as for example indicated in FIGURE 13. While thus folded over the board, the opposite flanks of the folded media are highly compressed between long narrow aligned upper and lower high frequency electrodes, which are briefly energized to provide dielectric heating of the acrylic fibers to thereby fuse the four layers together along the narrow strips 390 and 392, which become the side seams of the pocket and thus close the side edges to form the pocket.

The electrodes applied to the opposite sides of the media to fuse the side edges will conform substantially in contour to the two narrow strips of fusion indicated at 390 and 392 in FIGURE 15, and the thickness of the four layers, along the lines of fusion will be fused to a thickness of about 10 to 15 thousandths of an inch.

Since it is desirable to secure the two thicknesses of media together at spaced points intermediate the side edges, such as along narrow strips 398, to prevent the two layers from separating unduly or to provide stiffeners, provision is made for fusing the acrylic fibers, along lines as indicated at 398 in FIGURE 15, through the use of further electrodes and the application of pressure and high frequency current thereto which may be effected simultaneously with the formation of the side seams. For this purpose, the pleating board is provided with elongated slotted openings, indicated at 302 where such narrow strips or ribs of fusion are to be formed. Each of the slotted openings are loosely covered or bridged by a thin flexible sheet 304 of Teflon of about three thousandths of an inch thickness. During the fusion process the Teflon does not fuse within the brief time cycle necessary to effect fusion of the media. The Teflon thus prevents the two layers of one flank of the pocket from being fused to the two layers of media forming the other flank of the pocket, while permitting the fusion of the two layers of each flank in a single operation. As in forming the side seams, upper and lower electrodes, are brought to bear under heavy pressure upon the four thicknesses of media and the intervening thin Teflon separator, and fusion of the compacted fibers is effected, to tie the two layers of each flank of the pleat together, along the narrow strips or ribs 398. The thicknesses of the two layers of media where so fused is reduced to about 5 to 10 thousandths of an inch. The high frequency current is simultaneously applied to all of the electrodes to produce the side seams and the narrow strips 398 of one fold or pocket in a single operation.

In FIGURE 18 (see also FIGURE 17) the shapes of one set of electrodes is indicated, such as the lower set. The end electrodes or conductor bars 310 and 312 which form the side seams, and the intermediate electrodes 314 which form the ribs 398 are affixed to a conductive base plate 316, which in practice can be grounded, and form a work table.

The upper electrodes 318 and 320 overlie the lower electrodes 310 and 312, and the intermediate upper electrodes 322 overlie the lower electrodes 314. The upper electrodes or conductor bars 318, 320 and 322 may be mounted upon a rigid conductive plate 324, insulated from ground. The plates 324 and 316 are connected to a source of high frequency current 326, through a switch 328. It will be understood that the upper plate 324 may be raised and lowered by any suitable means such as by a power cylinder (not shown).

With the pleater board and a fold of media folded thereover (as indicated in FIGURE 16) disposed between the electrode plates 324 and 316 (see FIGURE 17) the upper plate 324 is lowered under heavy pressure to compress the media fibers between the upper and lower electrodes. While compressed, high frequency power is applied for a brief interval by closing switch 328. By reason of the non-mineral non-conductive organic nature of the plastic fibers, dielectric heating in the compressed plastic fibers results in the fusion thereof into a more or less homogeneous compacted transparent mass.

To provide for the ready removal of the excess material 16, after fusion of the side seams has been effected, the upper electrodes 318 and 320 may have a narrow raised flange along the length of its outer edge, in the manner indicated in FIGURE 19. There the electrode 320 is shown in cooperating compressing relation to the lower electrode 312 and is provided with a narrow side flange 321 of about ten thousandths of an inch height. The side flange may provide enhanced dielectric heating therealong while squeezing the fused material to a thickness of two or three mils. A line of weakness along the outer edge 391 of the fused seam 390 is thus created, whereby to permit the ready breakaway and removal of the excess material as indicated at 16.

As soon as one pleat has been provided with side seams together with the fused ribs 398 referred to, the pleater board is removed therefrom, and a further appropriate length of media is drawn from the source of supply to form a second pleat. Such further length is folded over the pleating board at the correct spacing from the first pleat, and the side edges and flanks thereof are subjected to fusion while compressed between the electrodes, to thereby form the second pocket. As many pleats or pockets as desired may be formed along a suitable length of media, such as four as shown in FIGURE 13. Thereupon the finished cartridge may be transversely severed from the source of supply of the media and the excess material indicated at 16 removed. It will be seen that an elongated rectangular section of media has thus been formed into a pleated cartridge, with no wastage except for the excess material 16.

It will be seen that when the finished cartridge is expanded to size for insertion into the grid, the remaining marginal material forming the side edges 394 and 396 become the top and bottom of the perimetral flange 74, while the marginal material along the edges 380 and 382 become the side portions of such flange.

The finished cartridge may be trimmed along the side and end edges if necessary. It may have a thin layer of filter adhesive sprayed upon the downstream surface to minimize dust blow off. It will be seen that the cartridge as thus completed is readily folded as indicated in FIGURE 14, and further compacted if desired for shipment or storage to thereby occupy a minimum of space. When such a cartridge is to be placed on the filter frame, it is expanded to the general shape indicated in FIGURE 13, and the pockets projected into the pocket supporting wires, with the folds 72 disposed over the grid wires 48, 50 and 52. It will be seen that the fused ribs 398 provide stiffening of the filter media and are disposed intermediate of and above and below the pocket forming loop wires 28 and 30, thereby reducing to a minimum the number of such wires required to adequately support the cartridge for effective filter operation.

For illustrative purposes, the depth of the wire loops forming the pockets 34, 36 and 38 are shown as relatively shallow, and the cartridge illustrated is intended to substantially conform thereto. The depth of such loops may be increased as desired, and the depth of the pleats or pockets of the cartridge will be increased accordingly to provide further extended area of filter media, where reduced resistance to air flow and greater efficiency is desired.

It will be understood however, that as the depths of such pockets are increased, the air duct or plenum downstream of the frame should have sufficient depth to accommodate the grid. Since in the usual installation, the depth of the frame 20 may be in the order of three inches, it will be seen that by providing the offset in the grid wires 48, 50 and 52, upstream into the frame, a substantial portion of the filter cartridge is located in the space occupied by the frame, which thereby reduces the length of duct required downstream behind the frame for a given extended area of filter media. Not only is the grid thus disposed partially within the frame to minimize the overall space requirement, but the shape of the grid, with the offsets in the wires 48, 50 and 52, cooperates with the cartridge to the extent that the cartridge can be constructed from a rectangular section of media in the manner set forth with little waste, and with a perimetral sealing flange disposed in a plane intermediate the plane of the upstream pleat folds 72, and the plane of the downstream pleat folds 370.

While a cartridge having four pockets is shown, the number of pockets can be reduced or increased to suit various shapes and sizes of frames and grids. Irrespective of the number of pockets, the cartridge may be formed of a rectangular section of media, with little waste, by following the principles set forth hereinabove.

Although the description of the cartridge is based on the use of two layers of media of different characteristics to provide a deep bed for dust accumulation, obviously a single layer, or as many layers as desired of material having the requisite characteristics may be employed. Also while media of acrylic fibers has been referred to, a wide range of flexible fibrous material of suitable filtering qualities may be employed as the media, in preparing the pleated cartridge utilizing some or all of the principles described.

While the invention has been referred to in connection with preferred embodiments, it will be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An air filter comprising a rectangular frame having an inwardly extending flange extending around the downstream side thereof, a pleat supporting wire grid secured to said flange, said grid having a rectangular wire frame affixed to the downstream side of said flange, and a plurality of wires lying in uniformly spaced vertical planes secured to the upper and lower sides of said wire frame, said wires having central portions thereof offset upstream into the frame, and pocket forming wires lying in generally horizontal planes affixed to the side portions of said wire frame, said pocket forming wires having downstream extending loop portions between the adjacent offset wires and the frame side portions, and upstream portions bent over the offset central portions of said offset wires, a filter cartridge having a plurality of pleats having folds disposed over the offset portions of said offset wires, and pocket forming portions extending into the loop portions of said pocket forming wires and a perimetral flange disposed downstream from the plane of said pleat folds and lying against the upstream side of said frame flange, and the inside faces of said frame, and displaceable resilient sealing rods bearing on said cartridge flange, and yieldingly sealing said cartridge flange against the upstream side of said frame flange and the inside faces of the frames.

2. An air filter comprising a rectangular frame, having an inwardly extending flange extending around the downstream side thereof, a pleat supporting wire grid secured to said flange, said grid having a rectagular wire frame affixed to the downstream side of said flange, and a plurality of wires lying in uniformly spaced vertical planes secured to the upper and lower sides of said wire frame, said wires having central portions thereof offset upstream into the frame, and pocket forming wires lying in generally horizontal planes affixed to the side portion of said wire frame, said pocket forming wires having downstream extending loop portions between the adjacent offset wires and the frame side portions, and upstream portions bent over the offset central portions of said offset wires, a filter cartridge having a plurality of pleats having folds disposed over the offset portions of said offset wires, and pocket forming portions existing into the loop portions of said pocket forming wires and a perimetral flange disposed downstream from the plane of said pleat folds and lying against the upstream side of said frame flange, and means for releasably sealing said cartridge flange against the frame and its flange.

3. An air filter comprising a rectangular frame having top and bottom and connecting side walls, said walls having a substantially continuous inbent flange extending around the frame on the downstream side thereof, a wire grid having a rectangular frame secured to the downstream side of said flange, said grid having vertical wires offset into the frame, and transverse sinuous wires forming downstream pockets for receiving the alternate folds and pockets of a pleated filter cartridge having a peripheral flange adapted to seat on the upstream side of said frame flange and against the walls of the frame, and sealing wires hinged to opposite walls of said frame and having portions adapted to releasably engage and compress the flange of a cartridge against said frame flange and the adjacent walls substantially continuously around the entire frame, each of said sealing wires being pivoted upon a wall centrally thereof on an axis parallel with the flange thereof and spaced therefrom, and each of said sealing wires having a sealing portion comprising a section extending along the side wall adjacent the flange thereof to an adjacent wall and a section extending along said adjacent wall adjacent its flange to the approximate center of said adjacent wall, and each of said wires terminating in a resilient loop, and tab means formed in said adjacent frame walls to releasably engage the loops of said wires to hold said sealing portion in position along the side and adjacent walls and the flange adjacent thereto.

4. A filter cartridge comprising a substantially rectangular section of flexible porous fibrous filter media in relatively thick sheet form, said section having a plurality of pleats intermediate the ends thereof with the pleat folds extending transversely across said section, said pleats having downstream pocket forming folds alternating with upstream folds, the pleats immediately adjacent each section end having end flanks on the section end sides thereof of lesser depth than the depth of the remaining flanks of all of the pleats, and means forming a seam closing the downstream pocket forming folds of the pleat ends, said means forming the seams being disposed inwardly of the side edges of the section, and extending away from the depth of each downstream fold a distance substantially corresponding to the depth of the said end flanks, and thence extending laterally toward the side edges of the media, the marginal portions of the section adjacent the opposite ends of the section, and the marginal portions along the sides of the section intermediate the lateral extensions of said seam forming means and disposed outwardly of the upstream folds forming a perimetral rectangular sealing flange extending around all of the pleats and lying in a plane intermediate of the plane of the downstream folds and the plane of the upstream folds.

5. A filter cartridge comprising a substantially rectangular section of flexible porous fibrous plastic filter media in relatively thick sheet form, said section having a plurality of pleats intermediate the ends thereof with the pleat folds extending transversely across said section, said pleats having downstream pocket forming folds alternating with upstream folds, the pleats immediately adjacent each section end having end flanks on the section end sides thereof of lesser depth than the depth of the remaining flanks of all of the pleats, and a heat fused seam closing the pleat ends disposed inwardly of the side edges of the section, and extending away from the depth of each downstream fold a distance substantially corresponding to the depth of the said end flanks, and thence extending laterally toward the side edges of the media, the marginal portions of the section adjacent the opposite ends of the section, and the marginal portions along the sides of the section intermediate the lateral extensions of said seams and disposed outwardly of the upstream folds forming a perimetral rectangular sealing flange extending around all of the pleats and lying in a plane intermediate of the plane of the downstream folds and the plane of the upstream folds.

6. A filter cartridge comprising two superimposed layers of substantially rectangular sections of porous fibrous filter media in relatively thick sheet form, said superimposed sections having a plurality of pleats intermediate the ends thereof with the pleat folds extending transversely across said section, said pleats having downstream pocket forming folds, alternating with upstream folds, the end pleats having end flanks on the section end sides thereof of lesser depth than the depth of the remaining flanks of all of the pleats, and means forming a seam closing the pleat ends disposed inwardly of the side edges of the sections, and extending away from the depth of each downstream fold a distance substantially corresponding to the depth of the said end flanks, and thence extending laterally toward the side edges of the media, the marginal portions of the sections adjacent the opposite ends of the sections, and the marginal portions along the sides of the sections intermediate the lateral extensions of said seam forming means and disposed outwardly of the upstream folds, forming a perimetral rectangular sealing flange extending around all of the pleats and lying in a plane intermediate of the plane of the downstream folds and the plane of the upstream folds, the layer of media disposed on the downstream side of the cartridge being formed of finer fibers and of greater density than the adjacent upstream layer of media in the cartridge.

7. A filter cartridge as set forth in claim 6, wherein the downstream exterior surface fibers of the downstream layer is coated with adhesive to resist dust blowoff.

8. A filter cartridge as set forth in claim 6, wherein the layers of media in the flanks are tied together at spaced intervals to hold the superimposed layers from undue separation.

9. A filter cartridge as set forth in claim 6, wherein the downstream exterior surface fibers of the downstream layer is coated with adhesive to resist dust blowoff, and wherein the layers of media in the flanks are tied together at spaced intervals to hold the superimposed layers from undue separation.

10. A filter cartridge comprising two superimposed layers of substantially rectangular sections of porous flexible filter media composed of acrylic fibers in relatively thick sheet form, said sections having a plurality of pleats intermediate the ends thereof, with the pleat folds extending transversely across said section, said pleats having downstream pocket forming folds, alternating with upstream folds, the end pleats having end flanks of lesser depth than the depth of the remaining flanks of all of the pleats, and heat fusion seams closing the ends of each of said pleats inwardly of the side edges of the sections, and extending away from the depth of each downstream fold a distance substantially corresponding to the depth of the said end flanks, and thence extending laterally toward the side edges of the media, the marginal portions of the sections adjacent the opposite ends of the sections, and the marginal portions along the sides of the sections intermediate the lateral extensions of said seams forming a perimetral rectangular sealing flange extending around all of the pleats and lying in a plane intermediate of the plane of the downstream folds and the plane of the upstream folds, the layer of media disposed on the downstream side of the cartridge being formed of finer fibers and greater density than the adjacent upstream layer.

11. A filter cartridge as set forth in claim 10, wherein the downstream exterior fibers of the downstream layer is coated with adhesive to resist dust blowoff.

12. A filter cartridge as set forth in claim 10, wherein the layers of media in the pleat flanks are heat fused together at spaced intervals to hold the superimposed layers from undue separation.

13. A filter cartridge as set forth in claim 10, wherein the downstream exterior surface fibers of the downstream layer is coated with adhesive to resist dust blowoff, and wherein the layers of media in the pleat flanks are heat fused together at spaced intervals to prevent undue separation.

References Cited by the Examiner

UNITED STATES PATENTS

| | | | |
|---|---|---|---|
| 1,779,458 | 10/1930 | Annis | 55—500 X |
| 1,890,499 | 12/1932 | Davies | 55—497 |
| 2,002,936 | 5/1935 | Davies | 55—521 X |
| 2,074,294 | 3/1937 | Woodruff | 55—493 |
| 2,080,154 | 5/1937 | Strindberg | 55—502 X |
| 2,135,863 | 11/1938 | Walker | 55—499 |
| 2,409,078 | 10/1946 | Swann | 55—493 X |
| 2,521,984 | 9/1950 | Lang | 55—486 |
| 2,711,781 | 6/1955 | Langer | 156—290 |
| 2,766,809 | 10/1956 | Parham | 156—290 |
| 2,795,289 | 6/1957 | Dresnek | 55—376 |
| 2,871,977 | 2/1959 | Kling | 55—391 X |
| 2,895,565 | 7/1959 | Le Brun et al. | 55—501 |
| 2,907,408 | 9/1959 | Engle et al. | 55—500 |
| 3,026,967 | 3/1962 | Stevens et al. | 55—500 |
| 3,047,994 | 8/1962 | Le Brun et al. | 55—493 |
| 3,100,557 | 8/1963 | Getzin | 55—490 X |
| 3,133,884 | 5/1964 | Graham et al. | 55—524 X |
| 3,144,315 | 8/1964 | Hunn | 55—486 X |
| 3,150,945 | 9/1964 | Baggeson | 55—493 |

ROBERT F. BURNETT, *Primary Examiner.*

HARRY B. THORNTON, *Examiner.*

L. H. McCARTER, *Assistant Examiner.*